Jan. 18, 1938.   O. H. HUSEBY   2,105,737
NEST BOX FOR HENS
Filed July 5, 1935   2 Sheets-Sheet 1

Inventor
Oscar H. Huseby
By Jack A. Seley
Attorney

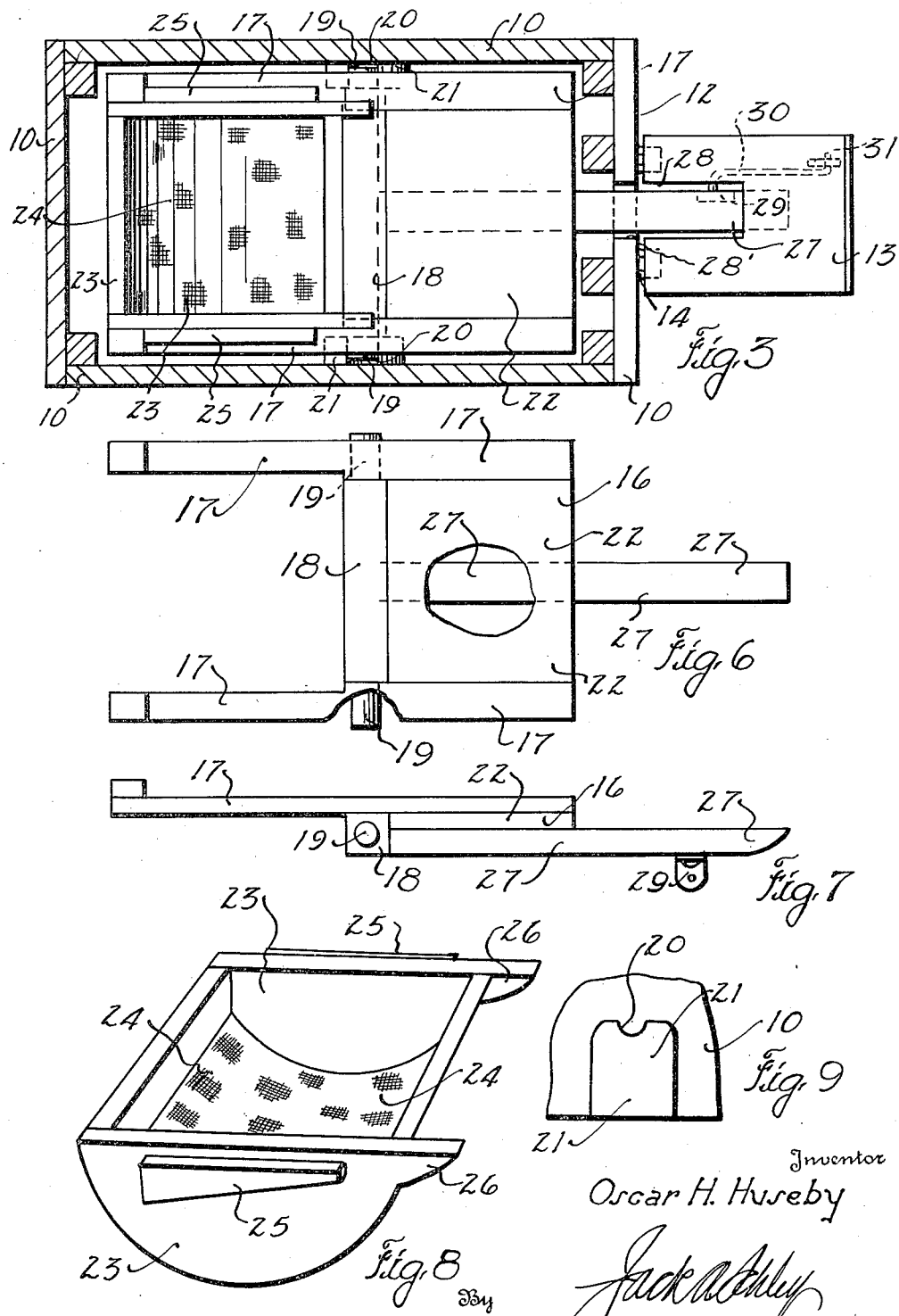

Patented Jan. 18, 1938

2,105,737

UNITED STATES PATENT OFFICE 2,105,737

NEST BOX FOR HENS

Oscar H. Huseby, Waco, Tex., assignor of one-half to Marrero Cross, Waco, Tex.

Application July 5, 1935, Serial No. 29,787

6 Claims. (Cl. 119—50)

This invention relates to new and useful improvements in nest boxes for hens.

One object of the invention is to provide an improved nest box for hens having means for shutting the hen within the box when said hen moves onto the nest, whereby a quiet, dark place, free from outside disturbance, for laying of eggs by the hen is provided.

An important object of the invention is to provide an improved nest box for hens including a nest proper which is mounted to swing within the box, the nest being connected with a door for closing the box and arranged to be swung by the weight of the hen, whereby the opening and closing of the door are controlled by the entrance and exit of the hen to and from the nest; the nest and its mounting being so arranged as to be readily disconnected from the door and removed from the box so as to be readily cleaned, or for any other purpose.

A further object of the invention is to provide a nest box for hens having a nest mounted to swing therein, the nest being removably supported within its mounting, whereby said nest may be quickly and easily removed from the box to remove eggs, or for cleaning, without disturbing the mounting or the rest of the structure.

Still another object of the invention is to provide an improved nest box for hens having a swinging door for closing the entrance to the box, said door being connected with a nest fulcrumed within the box whereby when no hen is on the nest the door is open and also whereby the weight of the hen on said nest closes the door, there being light openings on each side of the door so that after the hen has laid and desires to leave the box she will move from the nest toward the door to swing said door open.

A still further object of the invention is to provide an improved nest box for hens having a swinging door which when open serves as a horizontal platform by which the hen may enter the nest within the box, said door being provided with a latch whereby when the door is swung to a closed position, it is automatically locked to trap the hen therein, which permits the box to be used as a trap nest.

A construction designed to carry out the invention will be hereinafter described, together with other features of the invention.

The invention will be more readily understood from a reading of the following specification and by reference to the accompanying drawings in which an example of the invention is shown, and wherein:

Figure 1 is a longitudinal, vertical sectional view of a nest box taken directly through the central portion thereof, constructed in accordance with the invention, and showing the door in an open position, Figure 2 is transverse, vertical sectional view taken on the line 2—2 of Figure 4, Figure 3 is a horizontal, cross-sectional view taken on the line 3—3 of Figure 1, Figure 4 is a front elevation of the box with the door closed, Figure 5 is an enlarged, sectional view of the latch, Figure 5a is a transverse, vertical sectional view taken on the line 5a—5a of Figure 5.

Figure 6 is a plan view of the nest hanger,

Figure 7 is a side elevation thereof,

Figure 8 is an isometric view of the nest proper, and

Figure 9 is an elevation of one of the bearing supports for the hanger.

Figure 1:
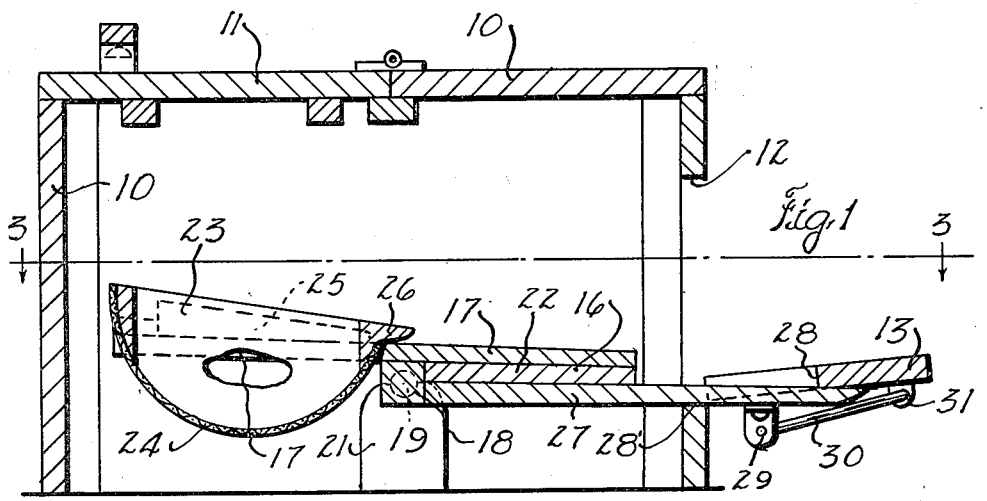
Figure 2:
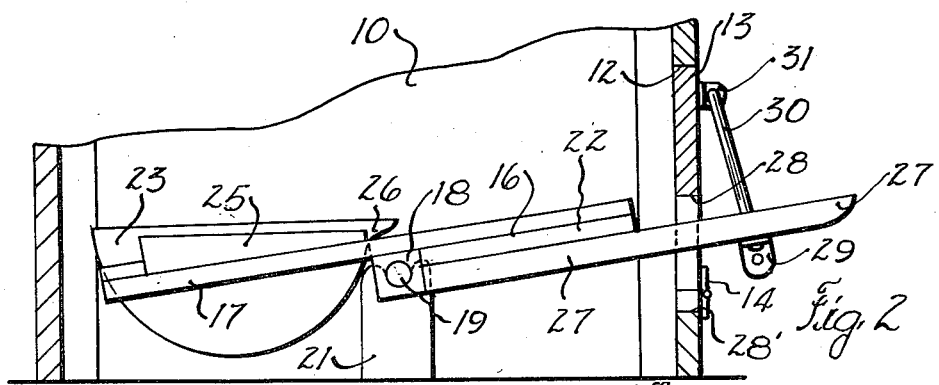

In the drawings, the numeral 10 designates a casing which preferably has a rectangular shape, but which may be of any desired shape or size. The casing may be constructed of wood, light metal or other suitable material. The rear half 11 of the top of the casing is hinged whereby it may be swung upwardly to permit easy access to the interior of the casing. The front end of the casing is formed with an opening 12, whereby a hen or other fowl may enter the casing, as will be explained.

Figures 4, 5, 5A:
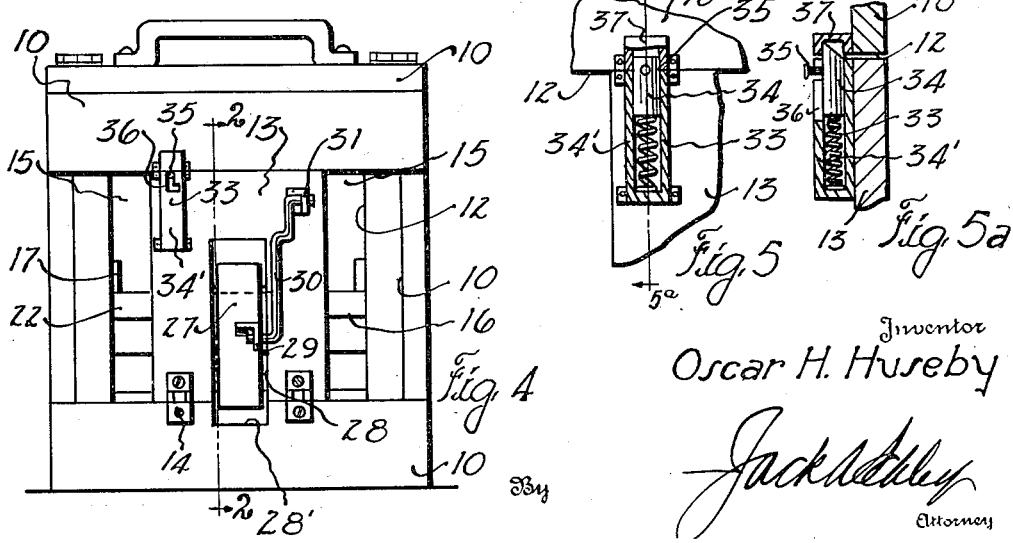

A swinging door 13 is mounted on hinges 14 at the central portion of the opening 12. The door is arranged to swing to a horizontal, or open position, or to a vertical, or closed position. The height of the door is such that when in a vertical position it extends the full vertical length of the opening 12. However, the width of the door is less than the width of said opening, whereby when it is in a vertical position (Figure 4) a narrow, vertical space 15 is provided on each side of the door. Thus, with the door in its closed position, light is visible from the interior of the casing through the spaces 15.

Within the casing near the lower end thereof, a hanger 16 is mounted to swing. The hanger comprises a pair of horizontal side bars 17 which extend longitudinally within the casing. The bars are connected at their midportion by a transverse square shaft 18 which has its ends formed with trunnions 19. These trunnions are arranged to be supported in grooves 20 in the upper ends of bearing supports 21 which are secured to the side walls of the casing 10, whereby the hanger may swing in a horizontal plane. It is noted that the trunnions are located directly beneath the side bars (Figures 6 and 7) so that when said trunnions are within the bearing supports, the side bars extend contiguous to the walls of the casing.

A transverse platform 22 is secured to the forward portion of the side bars, as is clearly shown in Figure 6. This platform is, of course, adjacent the opening 12 in the front side of the casing 10, so that a hen entering the opening 12 will immediately move onto said platform. Between the rear ends of the side bars 17, a suitable nest 23 is removably mounted. This nest is shown in Figure 8 and is preferably provided with a curved, screened bottom 24, which receives hay, straw or other suitable nest material. Each side of the nest has longitudinal supporting bars 25 which are arranged to engage the upper edge of the bars 17 of the hanger to prevent downward displacement of the nest when the same is located between said bars. To further support said nest its forward corners have lugs 26 which engage the rear of the platform 22.

With the above arrangement it will be seen that the door 11 in the top of the casing may be opened and the nest 23 readily lifted from between the bars 17. Since the entire hanger is supported by the trunnions engaging in the supports 21, it is obvious that said hanger may also be readily lifted from within the casing through the door 11. The replacement of the parts may be just as easily accomplished. It is pointed out that the weight of the platform 22 is greater than the weight of the nest 23, whereby when the hanger and nest are located within the casing, the forward end of the hanger is in its lowermost position, with the nest raised with relation thereto.

For connecting the hanger with the door 13 so that swinging of the former will open and close said door, an actuating member or extension 27 extends forwardly from the central portion of the platform 22, being secured to the underside thereof. The extension passes outwardly through a slot 28 at the lower end of the door 13 and has an ear 29 on its underside near its outer end. A link 30 has its lower end pivoted in this ear, while its other end is pivotally connected in an ear 31 on the outer face of the door 13 at the upper end thereof.

With the nest 23 unoccupied, the weight of the platform 22 will swing the forward end of the hanger 16 downwardly to the position shown in Figure 1. This causes the front end of the extension to swing downwardly. The downward swing of the front end of the hanger and extension is limited by the underside of the extension striking the bottom of a groove 28' in the bottom front wall of the casing. It is noted that the groove 28' is in alinement with the slot 28 in the door and forms a continuation thereof.

When the forward end of the extension 27 swings downwardly, it will be seen that the door 13 will be swung to its open or horizontal position through the medium of the link 30 (Figure 1). In this position, the inner face of the door becomes the top of a platform which is formed by the horizontally disposed door directly before the opening 12 in the forward end of the casing. This platform makes for an easy entrance by the hen through the opening into the casing 10.

When a hen enters the opening 12, she moves onto the platform 22 first and then onto the nest proper 23. As soon as her weight is placed on the nest, the hanger 16 is swung, which swings its forward end and the extension 27 upwardly. The upward swinging of the forward end of the extension causes the door 13 to be swung to its closed or vertical position through the medium of the link 30. This closes the opening 12 except for the narrow vertical spaces 15 on each side of the door. So long as the hen remains on the nest, the door remains closed and the hen remains undisturbed by other hens, or other animals. The spaces 15 are not large enough to admit a great deal of light into the interior of the box and therefore the nest is comparatively dark whereby the hen may lay under ideal conditions. Further, it has been found that more than one hen will invariably try to get on the same nest at the same time, which not only dirties the eggs in the nest but many times breaks them. It is well known that washing detracts from the market value of the eggs as it takes the lustre and polish from the surface. The box herein provided prevents this because only one hen can be on the nest at one time. So long as she remains on the nest the door remains closed and interference from outside sources is prevented.

Although, as has been stated, the spaces 15 do not admit light to the rear of the casing 10, yet a hen setting on the nest 23 can see the outside light through these spaces. Therefore, when she desires to leave the nest she will naturally go toward this light, which causes her to move onto the platform 22. As soon as her weight is transferred from the nest to said platform the hanger is swung to its original position (Figure 1) and the door 13 swung open through the link 30 to permit the hen to leave the box.

It it is desired to use the box as a trap nest to trap each hen within the nest, the door 13 is provided with a latch 33 which is secured at its upper end at one side thereof. The latch is clearly shown in Figures 5 and 5a and includes a spring-pressed plunger 34 slidable in a sleeve 34'. The plunger has a radially extending pin 35 engaging in an L-slot 36 whereby when the pin is in the leg of said slot the plunger is held downwardly within the casing.

When the pin is in the vertical elongated portion of the slot, the spring holds the plunger in its raised position projecting from the upper end of the sleeve. The extreme upper end of the plunger is beveled so as to engage a keeper 37 on the front wall of the casing 10. It is obvious that when the plunger projects from the sleeve and the door 13 is swung to a closed or vertical position, said plunger will automatically engage under the keeper to lock the door in a closed position. Opening of the door can be accomplished only by depressing the plunger manually. Thus, the box may be used as a trap nest by permitting the plunger to extend from the sleeve, whereby each time a hen moves onto the nest 23, the door is swung closed and automatically locked. If the nest is used in the ordinary manner, the plunger is depressed and held so by the engagement of the pin 35 with the horizontal leg of the slot 36.

From the above it will be seen that the actuation of the door is positively controlled by the weight of the hen upon the hanger and nest. When it is desired to remove the nest 23, it is only necessary to raise the door 11 in the top of the casing and lift the nest from the hanger. It is as easily replaced. If the hanger 16 is to be removed for cleaning, or for any other purpose, it is merely necessary to disconnect the lower end of the link 30 from the ear 29, after which the hanger may be lifted from the casing through the door 11. The removability of either the nest individually, or of both nest and hanger is an important feature as it permits the nest to be maintained absolutely clean at all times, which cleanliness is very necessary and essential to the proper maintenance of a chicken farm.

What I claim and desire to secure by Letters Patent is:

1. A nest box for hens, comprising, a casing having an opening in a vertical side wall thereof for the passage of a hen to and from the interior of the casing, an outwardly opening door hingedly mounted at its bottom edge portion for closing said casing opening, a removable hanger mounted on transversely disposed supports at its opposite sides whereby to rock within the casing, a nest located on the rear end portion of the hanger, said hanger being constructed with a platform forward of its pivotal axis and the forward portion of the hanger being normally in a lowered position with the rear portion carrying the nest raised, but when in either the normal or its tilted operated position with the forward portion raised and rear portion lowered the hanger being nearly in a horizontal position, and means cooperatively connecting the forward portion of the hanger and the door whereby the door is automatically opened when the forward portion of the hanger is swung downwardly and the door thereby provides a substantially horizontal external platform at the casing opening whereby a hen can conveniently enter the casing and move upon the nest, the weight of the hen on the nest tipping the hanger whereby to close the door and holding it closed until the hen leaves the nest and transfers its weight to the portion of the hanger forward of its pivotal axis, thereby depressing the forward portion of the hanger and automatically opening the door.

2. A nest box for hens, comprising, a casing having an opening in a vertical side wall thereof for the passage of a hen to and from the interior of the casing, a swinging door for closing said opening, said door being hingedly mounted at the bottom of the opening and constituting a substantially horizontal platform in its open position, a removable hanger pivotally mounted transversely whereby to rock within the casing, a nest removably mounted on the rear end portion of the hanger, the portion of the hanger forward of its pivotal axis being provided with a platform and a projection forward of said platform, the portion of the hanger forward of its pivotal axis normally overbalancing the portion rearward of the axis and the hanger platform portion being substantially horizontal, and means cooperatively connecting said forward projection of the hanger and said swinging door so that the door is automatically opened when the hanger moves to its normal position and the door supported in its platform providing position, whereby a hen can conveniently enter the casing and move upon the nest, the weight of the hen on the nest overbalancing and tipping the forward portion of the hanger and thereby closing the door and holding it closed until the hen leaves the nest and transfers its weight to the platform portion of the hanger.

3. The nest box structure as set forth in claim 1 and further including an external selectively controllable latch element on said casing door settable at will for automatic catching operation to lock the door in its closed position whereby to trap the hen within the casing.

4. A nest box for hens, comprising, a casing having an opening in a side wall thereof for admitting a hen to the interior of the casing, an outwardly opening swinging door for closing said opening and constituting a platform in its opened position, said door being hingedly mounted at its bottom edge portion and provided with a slotted opening extending from said hinged edge portion, a rocking frame mounted to swing about a transverse horizontal axis within the casing, a nest carried by the rear end portion of the frame, said frame being constructed with an overbalancing platform forward of its pivotal axis so that normally its forward end portion is in a lowered position with the nest at its rear portion raised, but nearly horizontal throughout its entire extent, the frame having a forward end extension projected through the slotted opening of said door and affording a support for the door in its opened position, pivotal link means cooperatively connecting said forward end extension of the rocking frame with the door and arranged so that the door is opened when the forward portion of the frame swings downwardly, whereby a hen can conveniently enter the casing and move upon the nest, the weight of the hen on the nest swinging the rocking frame to close the door and holding it closed until the hen leaves the nest and transfers its weight to the portion of the frame forward of its pivotal axis, thereby opening the door to let the hen leave the casing.

5. The nest box structure as set forth in claim 4 and further including an externally controllable latch on the door settable at will for automatically locking the door when it is swung to closed position.

6. A nest box for hens, comprising, a casing having an opening in a vertical wall thereof for admitting a hen to the interior of the casing, an outwardly opening swinging door for said casing opening, said door being narrower than the casing opening to afford light openings on opposite sides of the door in its closed position, said door being hingedly mounted at its bottom edge portion and affording a substantially horizontal external threshold platform in its opened position, a rocking frame pivotally mounted to swing about a transverse horizontal axis within the casing, the frame carrying a nest at its rear portion and provided with a platform forward of its pivotal axis within the casing, the forward portion of the frame normally overbalancing the rear portion and having a forward extension projecting outside the casing and adapted to support said door in its opened position, and pivotal link means cooperatively connecting the door and said forward extension of the rocking frame whereby the door is automatically opened and closed by actuation of said frame, and in the normal position of the parts a hen can conveniently enter the casing and move upon the nest, the weight of the hen on the nest overbalancing the forward portion of the rocking frame and effecting the closing of the door and holding the door closed until the hen leaves the nest and transfers its weight to the portion of the frame forward of the pivotal axis thereof and thereby effects the opening of the door.

OSCAR H. HUSEBY.